W. E. BURROWS.
AUTOMATIC GEAR SHIFTING MECHANISM.
APPLICATION FILED OCT. 13, 1916.

1,246,049.

Patented Nov. 13, 1917.

4 SHEETS—SHEET 1.

W. E. BURROWS.
AUTOMATIC GEAR SHIFTING MECHANISM.
APPLICATION FILED OCT. 13, 1916.

1,246,049.

Patented Nov. 13, 1917.
4 SHEETS—SHEET 3.

Inventor
W. E. Burrows

Witness

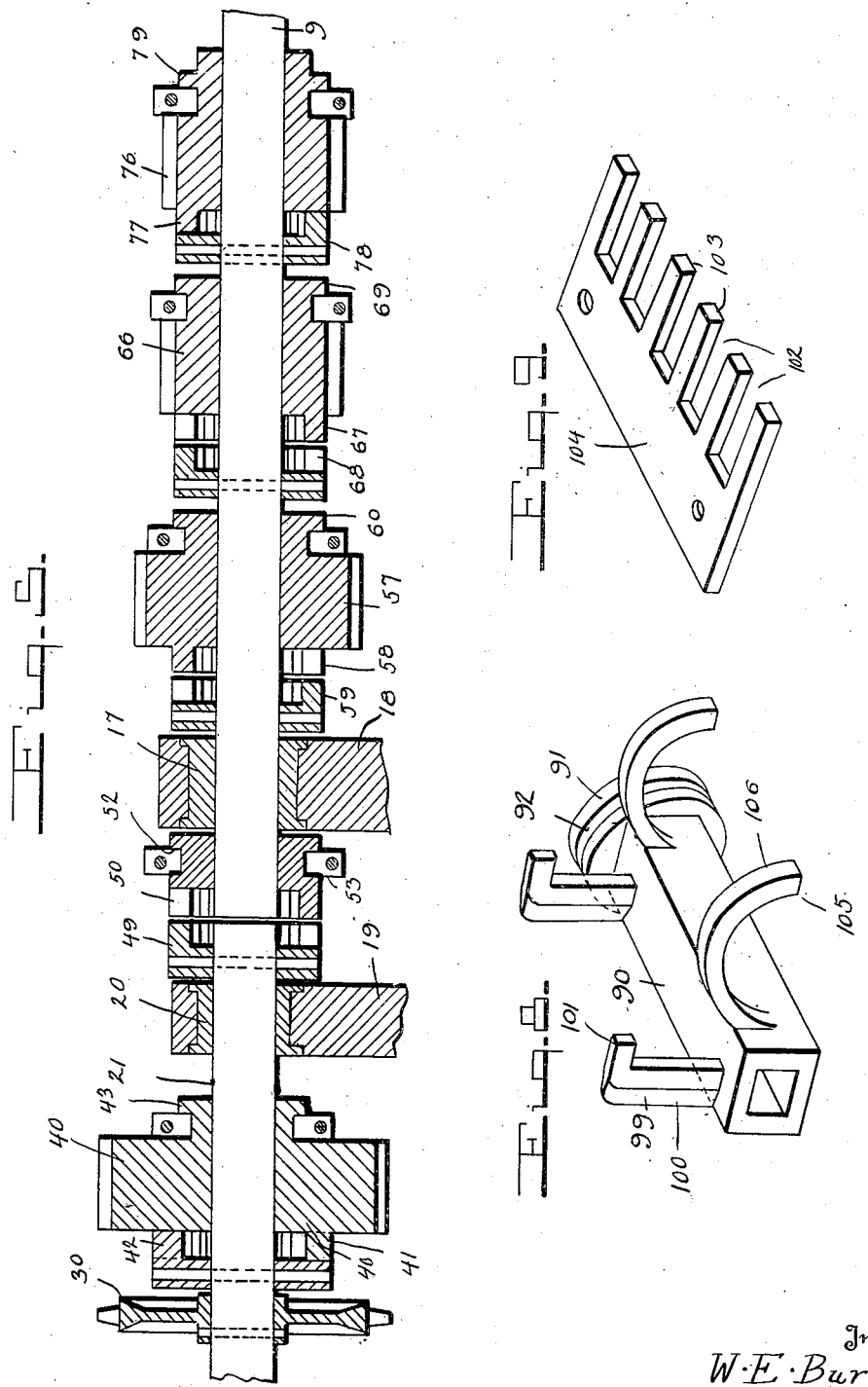

UNITED STATES PATENT OFFICE.

WILLIAM E. BURROWS, OF ST. JOSEPH, MISSOURI.

AUTOMATIC GEAR-SHIFTING MECHANISM.

1,246,049.

Specification of Letters Patent.

Patented Nov. 13, 1917.

Application filed October 13, 1916. Serial No. 125,387.

*To all whom it may concern:*

Be it known that I, WILLIAM E. BURROWS, a citizen of the United States, residing at St. Joseph, in the county of Buchanan and State of Missouri, have invented certain new and useful Improvements in Automatic Gear-Shifting Mechanism; and I do hereby declare the following to be a full, clear, and exact description of the invention, such as will enable others skilled in the art to which it appertains to make and use the same.

This invention relates to new and useful improvements in automatic gear shifts for motor vehicles and the principal object of the invention is to provide a gear shift which is automatically controlled by the speed of the vehicle.

Another object of the invention is to provide a gear shifting device which will avoid overtaxing the motor and which is so arranged that it will operate automatically upon the releasing of the clutch.

A further object of the invention is to provide a means for locking the gears in shifted position so as to avoid danger of the same changing while the vehicle is in motion and being driven from the motor.

A still further object of the invention is to provide a gear shift which is so arranged that the counter-shaft is not driven except when the car is running on reverse, low and intermediate gears.

A still further object of the invention is to provide a governor which is driven by the rear construction and operates independently of the motor speed to shift the gears thereby insuring against the possibility of overtaxing or stalling the motor.

A still further object of the invention is to provide a gear shift which will automatically change to low speed when the vehicle comes to a stop, thereby avoiding the necessity of the driver removing his hands from the steering wheel of a vehicle, thus avoiding any possibility of accidents.

With these and other objects in view the invention consists in the novel combination and arrangement of parts which will be fully set forth in the following specification and accompanying drawings, in which:—

Figure 1:
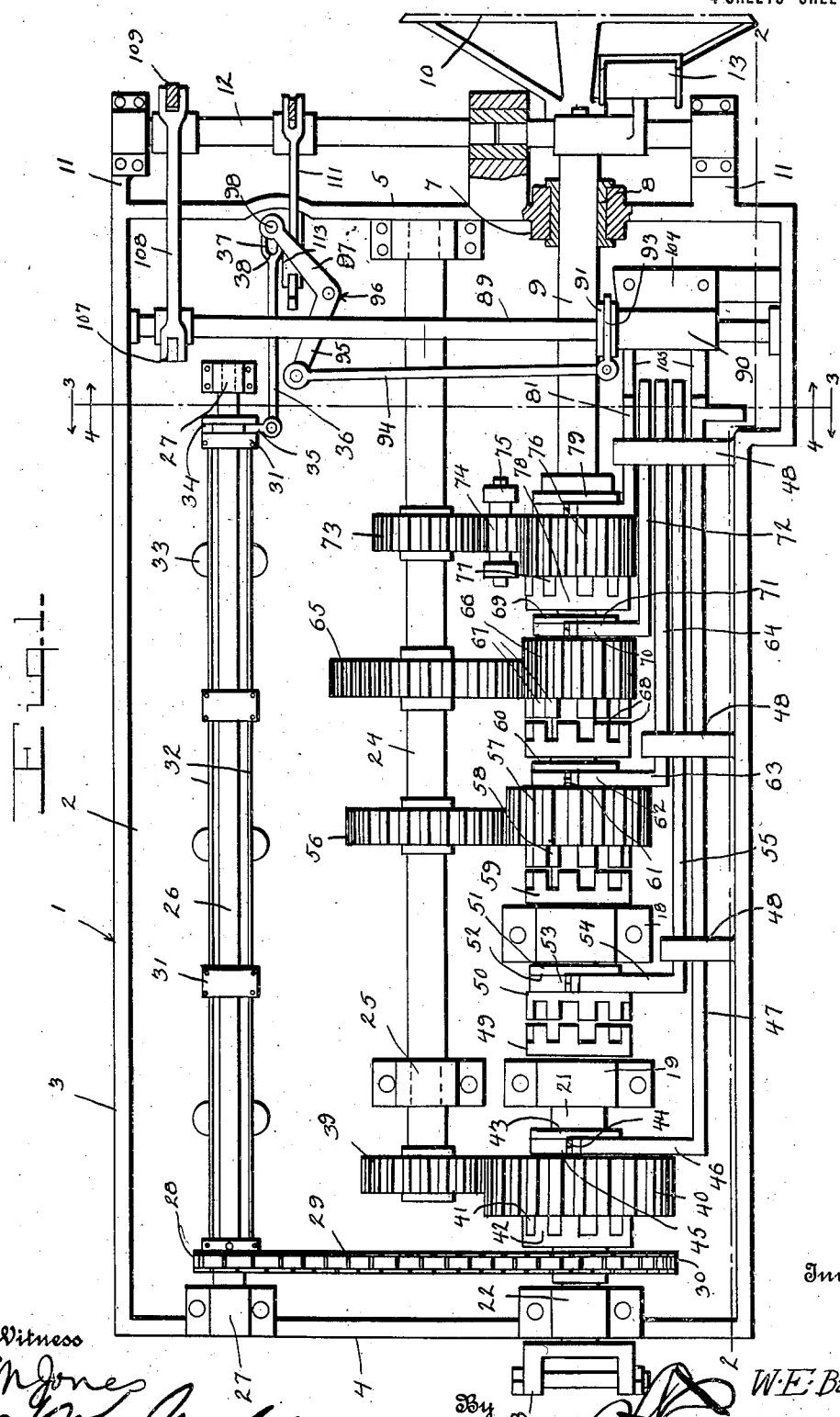
Figure 2:
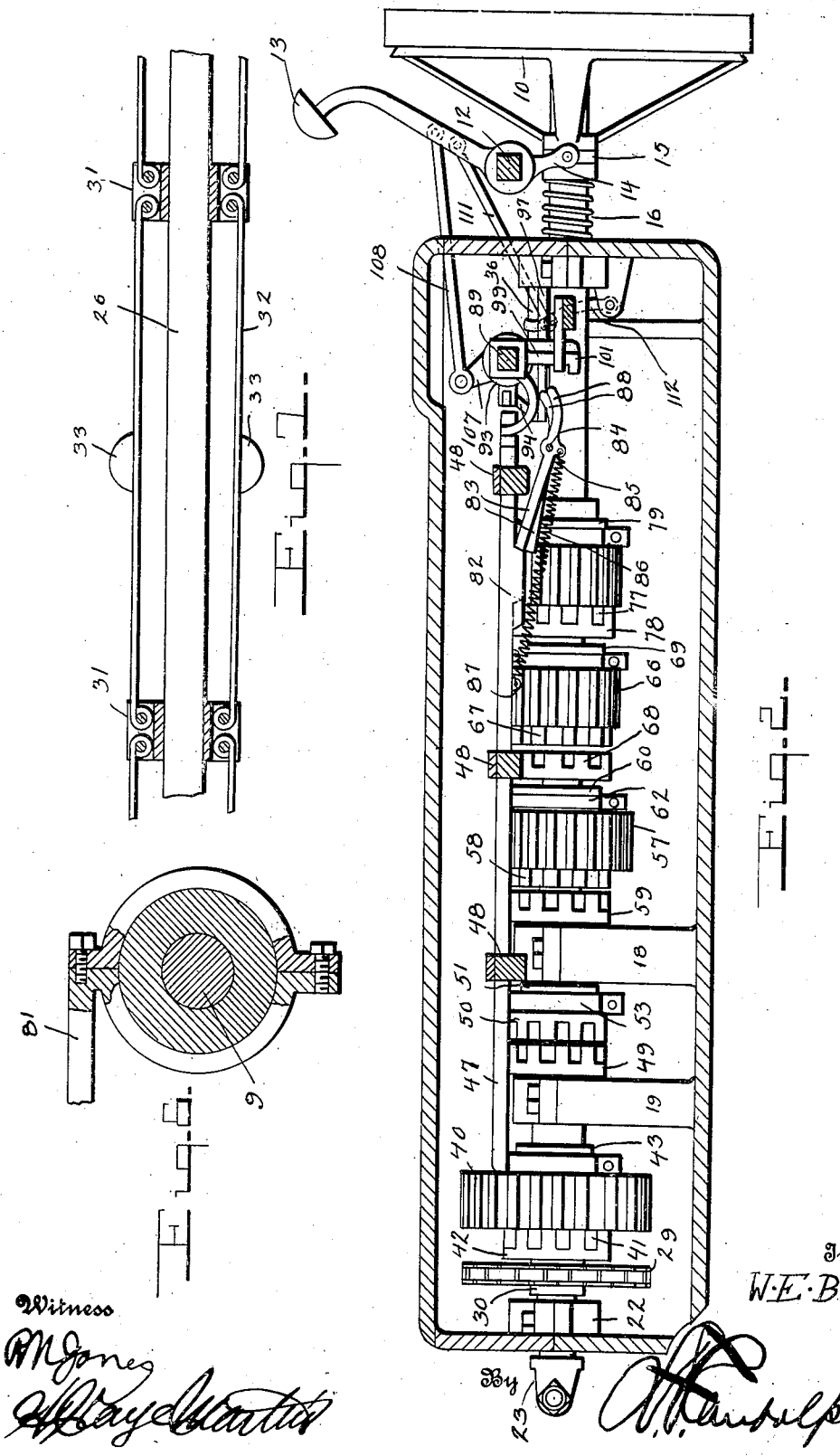
Figure 3:
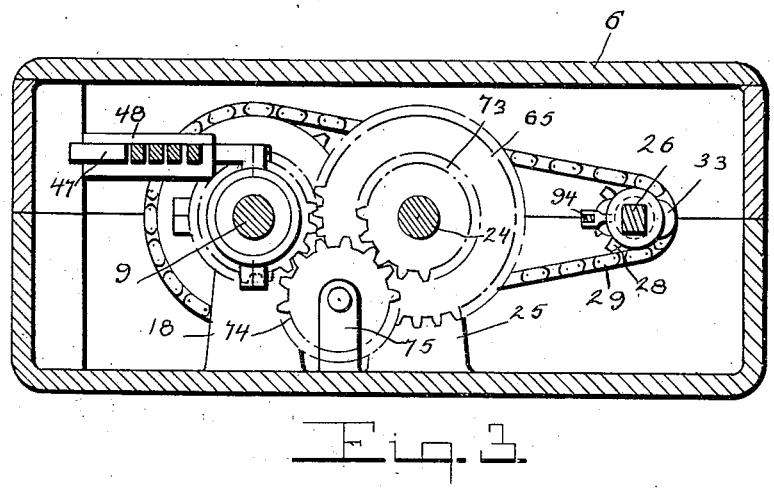
Figure 4:
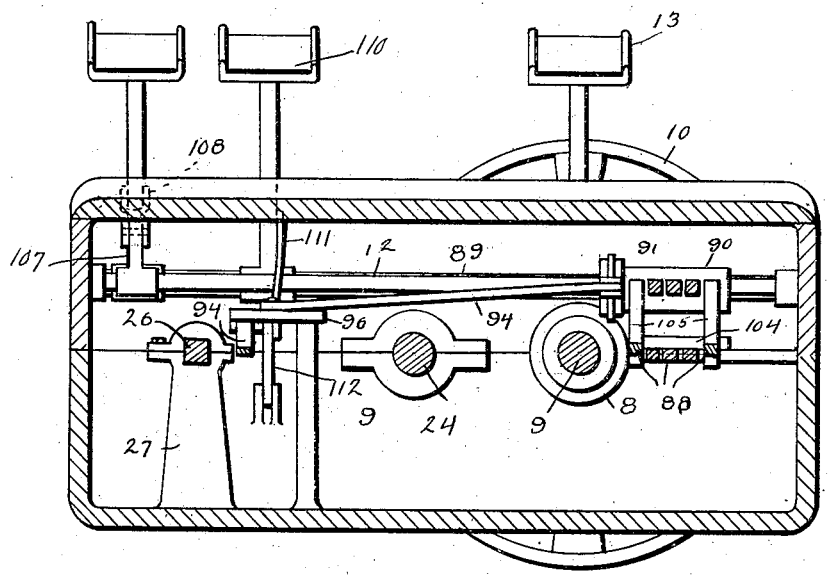

Figure 1 is a top plan view of a transmission constructed in accordance with this invention and showing the top cover plate removed, said view also showing parts of the device in section to more clearly illustrate the details of construction, Fig. 2 is a longitudinal sectional view through the transmission taken on line 2—2 of Fig. 1, Fig. 3 is a sectional view through the transmission taken on line 3—3 of Fig. 1, Fig. 4 is a view similar to Fig. 3 taken on line 4—4 of Fig. 1, Fig. 5 is a longitudinal sectional view through a fragment of the transmission showing the gears and sleeves in section and illustrating in detail the construction of the main shaft, Fig. 6 is a transverse sectional view through the main shaft, Fig. 7 is an enlarged detail view partly in section of the governor and governor shaft, Fig. 8 is a detail perspective view of the sleeves controlled by the governor for controlling the shifting of the gears, and Fig. 9 is a detail perspective view of the locking comb for holding the sleeves illustrated in Fig. 8 in various positions to insure the locking of the gears against shifting when the vehicle is in operation.

Referring to the drawings by characters of reference, the numeral 1 designates as an entirety the gear casing for the transmission comprising a bottom wall 2 having the side walls 3 formed integrally therewith, end walls 4 and 5 are formed integrally with the bottom wall and the whole is covered by a suitable cover plate 6 which is constructed in the manner illustrated in Figs. 2, 3, and 4. Formed in the front wall 5 of the transmission casing is a suitable hollow bar 7 provided with an opening through which a bearing bushing extends in which the main drive shaft from the motor designated by the numeral 9 is rotatably mounted. This drive shaft is connected at its forward end to the sliding members 10 of the main clutch and it will thus be seen that when the clutch is in engagement the shaft 9 will be driven. Suitable brackets 11 extend forwardly at spaced intervals from the front wall 5 of the transmission casing and journaled in the forward ends of said brackets is a shaft 12 for controlling the movements of the various levers carried thereby. This shaft is provided with a clutch pedal 13 which extends upwardly therefrom and a forked lever 14 extends downwardly from the pedal and engages the walls of the groove 15 formed in the clutch member 10 hereinbefore referred to. It will thus be seen that when the clutch pedal 13 is pressed forwardly, the shaft 12 will be partially rotated and the clutch member will be withdrawn from engagement with the clutch member of the motor. A suitable compression coil spring 16 is interposed between the front wall of the gear casing 1 and the clutch member 10 so as to normally force said clutch member into engagement with the clutch member on the motor. The shaft 9 which is journaled at its forward end in the bushing 8 extends to a point near the rear end of the casing 1 and the rear end of said shaft is journaled in a bushing 17 mounted in a suitable pedestal 18 which is carried by the bottom wall 2 of the transmission casing. A similar pedestal 19 is mounted slightly in the rear of the pedestal 18 and it is provided with a bushing 20 for rotatably supporting the forward end of the drive shaft 21, the rear end of which is journaled in a suitable bearing 22 at the rear end of the transmission casing. This drive shaft 21 is provided at its extreme rear end with a universal joint 23 to which the propeller shaft of the vehicle is connected. It will be noted that while the shafts 9 and 21 are in axial alinement the same are independently rotatable in their respective bearings and rotation of the drive shaft 21 is effected by either driving through the counter-shaft or directly from the shaft 9 according to the meshing of the gears.

The counter-shaft hereinbefore referred to is designated by the numeral 24 and is journaled in suitable bearings 25 within the transmission casing 1 and this shaft extends parallel to the shafts 9 and 21 hereinbefore referred to. A governor shaft 26 is journaled in suitable bearings 27 within the transmission casing and extends parallel with the shaft 24 and mounted at one end of the governor shaft is a sprocket 28 over which a chain 29 runs.

This chain 29 runs over a similar sprocket 30 which is mounted on the drive shaft 21 and it will thus be seen that the speed of rotation of the governor shaft depends upon the speed of rotation of the drive shaft. Slidably mounted on the governor shaft are a plurality of sleeves 31 which are connected to each other by longitudinally extending spring meal strips 32 having attached intermediate their ends suitable governor weights 33. It will thus be seen that when the shaft 26 rotates, the centrifugal force of the weights 33 will tend to move the sleeves 31 longitudinally on said shaft. The longitudinal movement of the sleeves 31 controls the shifting of the gears in a manner to be more fully hereinafter described. Upon reference to Fig. 1 it will be seen that the end sleeve 31 is provided with an annular groove 34 in which the forked member 35 carried on the end of the rod 36 engages. This rod 36 is provided at the end opposite the forked member 35 with a suitable enlarged portion 37 formed with a longitudinal slot 38 in which the end of a bell crank to be more fully hereinafter described is in turn connected.

Mounted at one end of the shaft 24 is a drive pinion 39 which meshes with a drive gear 40 which in turn is slidably mounted on the shaft 21. This gear 40 is provided with a clutch element 41 which is adapted to coöperate with a clutch element 42 carried by the drive shaft 21. This clutch element 42 is keyed or otherwise rigidly connected to the drive shaft 21 while the gear 40 and clutch element 41 carried thereby is not only slidable on said shaft 21 but is free to rotate with relation thereto except when the clutch elements 41 and 42 are in engagement. A suitable collar 43 is formed on the end of the gear 40 opposite that on which the clutch element 41 is formed and this collar is grooved as at 44 to receive a suitable strap 45 formed at the end of the shifting arm 46 which in turn is formed at the end of the shift rod 47, which rod is slidable through suitable brackets 48 within the transmission casing and extends to a point adjacent the forward end of said casing. This shift rod 47 is adapted to be controlled by the shifting means which will be hereinafter more fully described. Mounted at the extreme forward end of the shaft 21 is a clutch element 49 which is attached to said shaft and rotates therewith. A similar clutch element 50 is slidably mounted on the rear end of the shaft 9 and yet is adapted to be driven by said shaft. It will thus be seen that when the clutch elements 49 and 50 are in mesh the shaft 21 will be driven directly by the shaft 9. In order to provide a shifting means for the clutch element 50, the said clutch element is provided with a collar 51 similar in construction to the collar 43 and this collar 51 is provided with a groove 52 in which the strap 53 is rotatably mounted. The strap 53 is formed at the end of an arm 54 formed at the rear end of the shift rod 55 which extends forwardly in parallel relation to the shift rod 47 and is slidably mounted through the brackets 48 to a point in a plane with the end of the shift rod 47. Mounted at a point intermediate the ends of the shaft 24 is the intermediate speed gear 56 which meshes with a pinion 57 mounted on the shaft 9. This pinion 57 is free to slide on said shaft 9 and is rotatably mounted with relation to the shaft and carries a clutch element 58 which is adapted to coöperate with the clutch 59 which is attached to the shaft 9. It will be seen that when the clutch elements 58 and 59 are in mesh, the pinion 57 will be driven thereby transmitting power to the gear 56 and driving the counter-shaft. In order to control the meshing of the clutch elements 58 and 59 the gear 57 is provided on the end opposite the clutch element 58 with a collar 60 which is provided with an annular groove 61 in which the strap 62 is rotatably mounted. This strap 62 is formed at the end of an arm 63 formed at the end of a shift rod 64 which, like the rods previously described is slidably mounted within the brackets 48 and is controlled by means of the shifting mechanism to be more fully hereinafter described.

Mounted centrally of the counter-shaft 24 is a gear 65 which meshes with a pinion 66 slidably and rotatably mounted on the shaft 9. This pinion 66 like the ones previously described, is formed with a clutch element 67 for meshing engagement with the clutch element 68 which is keyed or otherwise connected to the shaft 9 for rotation therewith. A collar 69 is formed on the pinion 66 opposite the clutch element 67 and is grooved to receive the strap 70 carried on the end of the arm 71 which is formed at the end of a shift rod 72 which in turn is slidably mounted in the brackets 48 and leads forwardly to the shifting mechanism previously referred to. The gears and pinions hereinbefore described as well as the clutch elements 49 and 50 are arranged to control the forward drive of the vehicle and are so set as to provide a low intermediate and high speed gear as in the construction of ordinary vehicles. The reverse drive is obtained by means of a pinion 73 mounted on the shaft 24 between the gear 65 and the forward end of said shaft which pinion 73 meshes with an idler pinion 74 mounted in suitable bearings 75 on the bottom 2 of the transmission casing. This pinion 74 in turn meshes with a drive gear 76 which is slidably mounted on the shaft 9 and is rotatable with relation thereto and this pinion 76 is provided with a suitable clutch element 77 for coöperation with a clutch element 78 which is keyed or otherwise rigidly connected to the shaft 9 so that when they are in mesh as illustrated in Fig. 1 the pinion 78 will be driven thereby imparting rotation to the shaft 24 which rotation is in a direction opposite to that employed by the pinions 57 and 66 hereinbefore referred to. The sliding of the pinion 76 is controlled by means of a collar 79 which is grooved to receive a strap 80 formed on the end of the shift rod 81 which extends to the shift controlling mechanism previously referred to and through a suitable bearing 48.

From the foregoing it will be seen that the complete gearing and clutches for the gears has been described and it now remains to describe the shifting mechanism by means of which the shift rods are actuated.

As shown in Fig. 2, each of the shift rods 47, 55, 64, and 81 is provided with a downwardly extending lug which projects from the under side thereof and is designated by the numeral 82. This lug is adapted to be engaged by a latch lever 83 which is pivoted to a stationary pivot 84. A downwardly extending ear 85 is formed on each latch lever and forms a connection for the forward end of a retractile coil spring 86, the rear end of which is attached to an ear 87 on the under side of each shift rod. A releasing arm 88 is formed on each of the levers 83 and these releasing levers are adapted to be engaged by the shifting arms of the sliding sleeve which will be hereinafter more fully described.

The shifting mechanism comprises a transversely extending rectangular shaft 89 which is rotatably mounted in the transmission casing near its forward end and is provided near one end with a sliding sleeve 90 which is best illustrated in Fig. 8. This sleeve has formed at one end a collar 91 provided with a groove 92 in which the forked member 93 formed on the end of the link 94 is rotatably mounted. This link is pivotally connected to the arm 95 of the bell crank lever designated generally by the numeral 96, the opposite arm 97 of which is provided with a stud 98 for projection into the slot 38 of the enlargement 37 of the rod 36. It will thus be seen that the sleeve is connected with the governors so that as the collars 31 of the governors move longitudinally of the governor shaft the sleeve will be shifted longitudinally of the shaft 89. The sleeve 90 is provided with a pair of locking arms 99 provided with sharpened edges 100 and the fingers 101. The edges 100 are adapted to act as guides for guiding the arms into the spaces 102 between the fingers 103 on the comb member 104 so that the sleeve will be locked against longitudinal movement after the gears have been shifted. Suitable cam arms 105 are formed on the sleeve adjacent the opposite ends and are arcuate as shown so that their curved outer faces 106 engage the ends of the shift rod to properly mesh with the various gears. It will thus be seen that in order to shift the rods the sleeve must be rotated and the simultaneous rotation of the sleeve with the clutch member 10 from engagement with the clutch member of the motor is effected by the provision of a crank arm 107, the upper end of which is connected to a link 108 while the lower end is attached to the squared shaft. This link 108 is connected to a lever 109 mounted on the clutch shaft 12 so that upon rotation of said clutch shaft by pressure on the foot pedal 13, the shaft 89 will be rocked thereby partially rotating the sleeve 90.

The reversing of the direction of travel of the vehicle is effected by pressure on the pedal 13 to throw the clutch out of gear and by exerting pressure on the pedal 110 which exerts pull on the link 111 to cause the lever 112 to engage a hook 113 formed on the arm 97 near the stud 98. It will thus be seen that such pull will move the bell crank lever 96 into the position shown in Fig. 1 and thereby cause the sleeve 90 to move inwardly to its limit so as to bring the innermost cam 105 into engagement with the shift rod 81 so that upon letting the clutch member 10 engage the coöperating clutch member on the motor, the shaft 9 will be driven thereby driving the pinion 76 and transmitting power through the pinion 70 to the pinion 73 thus driving the countershaft in a reverse direction. Simultaneously with the shifting of the sleeve 90 to its innermost position and the turning of the same so as to move the shift rod 81 to the rear, the cam 105 at the outer end of the sleeve engages the shift rod 47 to cause the gear 40 to move rearwardly and bring its clutch member 41 into mesh with the clutch member 42 of the shaft 21 and it will thus be seen that the power transmitted to the counter-shaft will be transmitted through the pinion 31 to the gear 40 and then to the drive shaft 21.

In using the intermediate gears, it will be seen that the pedal 110 is released and the sleeve 90 allowed to move outwardly on the shaft 89 until the innermost cam 105 alines with the shift rod 72. Upon allowing the clutch member 10 to engage the coöperating clutch member on the motor of the vehicle, it will be apparent that the shaft 89 will be partially rocked thereby forcing the shift rod 72 rearwardly and causing the clutch members 67 and 68 to engage thereby driving the counter-shaft and simultaneously with such engagement the shift rod 47 is moved rearwardly to cause the clutch members 41 and 42 to engage and it will thus be seen that the vehicle will move forwardly at low speed. As the speed of the vehicle picks up it will be apparent that the governors will tend to slide the sleeves 31 rearwardly and this action will cause pull to be exerted on the rod 36 and when the operator moves the clutch pedal 13 forwardly, it will be seen that the shaft 89 will be rocked to cause the members 105 to disengage the shift rods 72 and 47 thus allowing the same to return to original position and as the clutch is again let in, it will be seen that the shift rods 64 and 47 will be engaged, thus throwing the intermediate gear into operation. After the vehicle has speeded up on second or intermediate gear, the clutch pedal 13 is again operated thereby causing the shaft 89 to rock and releasing the sleeve 90 from locked position thus allowing the governors to again act to move the sleeve longitudinally to a still farther outward position so that the innermost cam member 105 on said sleeve will engage the shift rod 55. Upon letting in the clutch it will be seen that the shaft 89 will return to original position thus partially rotating the sleeve 90 and causing the innermost cam member 105 to shift the shift rod 55 to bring the clutch members 49 and 50 into coöperative relation and it will thus be seen that a direct drive is made between the shafts 9 and 21. In this operation, it will be seen that the outermost cam arm 105 will have moved beyond the end of the shift rod 47 and thus the clutch members 41 and 42 will not engage thereby allowing the counter-shaft 24 to remain idle. It will thus be seen that when the vehicle is operating on high or direct gears, the counter-shaft will not be driven and thus any wear on the bearings thereof is eliminated.

While in the foregoing there has been shown and described the preferred embodiment of this invention, it is to be understood that such changes may be made in the combination and arrangement of parts as will fall within the spirit and scope of the invention as claimed.

What is claimed is:—

1. In an automatic gear shift, a main drive shaft, a counter-shaft, a driven shaft, a clutch connecting the main drive shaft with the crank shaft of a motor, pinions rotatable on the main drive shaft, pinions on the counter-shaft meshing with the pinions on the main drive shaft, clutch elements carried by the pinions on the drive shaft, clutch elements carried by the drive shaft and adapted to mesh with the clutch elements on the pinions, automatic means controlled by the speed of the vehicle for controlling the meshing of the clutch elements, locking means for said elements, and means controlled by the releasing of the clutch to release the locking means.

2. A device of the class described including a main drive shaft, a counter-shaft, a driven shaft, gears on the counter-shaft, pinions on the drive shaft meshing with the gears on the counter-shaft, said pinions being slidably mounted on the drive shaft, clutch elements carried by said pinions, clutch elements secured to the drive shaft and adapted to coöperate with the clutch elements on the pinions and means to automatically slide the pinions on the drive shaft to cause their clutch elements to mesh with the clutch elements of said drive shaft whereby the counter-shaft will be driven.

3. In an automatic gear shift, a drive shaft, a counter-shaft, a driven shaft, a governor shaft, driven from the driven shaft, a clutch connecting the drive shaft with the crank shaft of a motor, a pedal controlling the operation of the clutch, pinions on the drive and counter-shaft, the pinions on the drive shaft being free to rotate thereon, clutches for controlling the individual rotation of each pinion whereby the speed of rotation of the counter-shaft will be controlled, rods controlling the operation of the clutches and means controlled by the governor shaft for automatically controlling the meshing of the pinions on the drive shaft.

4. In an automatic gear shift, a drive shaft, a driven shaft, a counter-shaft, a governor shaft, gears mounted on the counter-shaft, pinions slidably and rotatably mounted on the drive shaft and meshing with the pinions on the counter-shaft, clutches carried by the drive shaft for controlling the rotation of the pinions thereon, a pinion on the driven shaft meshing with one of the pinions on the counter-shaft, a clutch for controlling the driving of the pinion on the driven shaft, a clutch for directly connecting the driven shaft with the drive shaft, means connecting the driven shaft with the governor shaft whereby the speed of the governor shaft is controlled by the speed of rotation of the driven shaft, governors mounted on the governor shaft, and shifting means for controlling the pinion controlling clutches operated by the governor.

5. In an automatic gear shift, a plurality of transmission gears, a driven shaft driven through various combinations of said gears, a governor shaft driven from the driven shaft, a governor on said governor shaft, and means controlled by the speed of rotation of the governor for controlling the shifting of the gears, locking means for rendering the gear shifting means inoperative when the gears have been set and means to release the locking means during the shifting movement of the gears.

6. In an automatic gear shift, a plurality of transmission gears, a driven shaft driven through various combinations of said gears, a governor shaft driven from the driven shaft, a governor on said governor shaft, means controlled by the speed of rotation of the governor for controlling the shifting of the gears, a sleeve slidable transversely of the device, a bell crank controlling the movement of the sleeve and actuated by the governor, and shift rods controlled by the movement of the sleeve for making the various combinations of gears.

7. In an automatic gear shift, a plurality of transmission gears, a driven shaft driven through various combinations of said gears, a governor shaft driven from the driven shaft, a governor on said governor shaft, a sleeve slidable transversely of the device, a bell crank controlling the movement of the sleeve and actuated by the governor, shift rods controlled by the movement of the sleeve for making the various combinations of gears, and arms on the sleeve for engagement with the shift rods to control the movements of the various gears.

8. In an automatic gear shift, a plurality of transmission gears, a driven shaft driven through various combinations of said gears, a governor shaft driven from the driven shaft, a governor on said governor shaft, a sleeve slidable transversely of the device, a bell crank controlling the movement of the sleeve and actuated by the governor, shift rods controlled by the movement of the sleeve for making the various combinations of gears, arms on the sleeve for engagement with the shift rods to control the movements of the various gears, and means for manually controlling the meshing of the reverse gear.

9. In an automatic gear shift, a plurality of transmission gears, a driven shaft driven through various combinations of said gears, a governor shaft driven from the driven shaft, a governor on said governor shaft, a sleeve slidable transversely of the device, a bell crank controlling the movement of the sleeve and actuated by the governor, shift rods controlled by the movement of the sleeve for making the various combinations of gears, arms on the sleeve for engagement with the shift rods to control the movements of the various gears, means for manually controlling the meshing of the reverse gear, and means to prevent the shifting of the gears without first releasing the clutch connecting the main drive shaft with the crank shaft of a motor.

In testimony whereof I affix my signature in presence of two witnesses.

WILLIAM E. BURROWS.

Witnesses:
   BENJAMIN F. HOLT,
   SOLOMON C. SHALE.